US010761711B2

(12) United States Patent
Koch et al.

(10) Patent No.: US 10,761,711 B2
(45) Date of Patent: Sep. 1, 2020

(54) USER INTERFACE CONTROL FOR METERED GRAIN DISCHARGE

(71) Applicants: AGCO Corporation, Duluth, GA (US); AGCO DO BRASIL SA LTDA, Ribeireo Preto (BR)

(72) Inventors: Jared J. Koch, Hesston, KS (US); Jay Anthony Leininger, Hesston, KS (US); Rodrigo Souza, Canoas (BR)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 16/556,200

(22) Filed: Aug. 29, 2019

(65) Prior Publication Data

US 2020/0073543 A1 Mar. 5, 2020

Related U.S. Application Data

(60) Provisional application No. 62/724,137, filed on Aug. 29, 2018.

(51) Int. Cl.
*G06F 3/0484* (2013.01)
*G06F 3/0481* (2013.01)
*G08C 17/02* (2006.01)
*A01D 41/127* (2006.01)

(52) U.S. Cl.
CPC ..... *G06F 3/04847* (2013.01); *A01D 41/1272* (2013.01); *G06F 3/04815* (2013.01); *G06F 3/04842* (2013.01); *G08C 17/02* (2013.01); *G08C 2201/30* (2013.01); *G08C 2201/93* (2013.01)

(58) Field of Classification Search
CPC ............. G06F 3/04847; G06F 3/04842; G06F 3/04815; A01D 41/1272; A01D 57/20; A01D 61/00
See application file for complete search history.

(56) References Cited

U.S. PATENT DOCUMENTS

| | | | | |
|---|---|---|---|---|
| 5,986,559 A | * | 11/1999 | Larson | G01B 5/14 172/4.5 |
| 6,097,425 A | * | 8/2000 | Behnke | B65G 67/22 348/120 |
| 8,490,375 B2 | * | 7/2013 | Kendrick | A01D 43/006 56/341 |
| 8,930,089 B2 | * | 1/2015 | Reeves | E02F 9/26 701/50 |
| 9,877,427 B2 | * | 1/2018 | Missotten | A01D 41/127 |

(Continued)

*Primary Examiner* — Dino Kujundzic

(57) ABSTRACT

A combine harvester comprises a storage bin for storing harvested crop, an unload conveyor, a flow gate for regulating a flow of harvested material from the storage bin to the unload conveyor, a first sensor for detecting a position of the flow gate and a second sensor for detecting a position of the unload conveyor. The harvester further comprises a controller configured to enable a user interface for receiving from an operator of the combine harvester a set point for the flow gate, an on/off indicator for the unload conveyor and an unload conveyor position indicator, presenting a graphic element including a graphical depiction of the unload conveyor, and indicating, using only graphical variations of the graphical depiction of the unload conveyor, a position of the unload conveyor, an operating status of the unload conveyor, the set point of the flow gate and the position of the flow gate.

7 Claims, 14 Drawing Sheets

(56) References Cited

U.S. PATENT DOCUMENTS

| | | | | |
|---|---|---|---|---|
| 10,380,811 B1* | 8/2019 | Stuart | ............... | A01C 7/00 |
| 2007/0037621 A1* | 2/2007 | Isfort | ............... | A01D 43/086 |
| | | | | 460/114 |
| 2010/0009731 A1* | 1/2010 | Coers | ............... | A01D 41/1217 |
| | | | | 460/1 |
| 2011/0023441 A1* | 2/2011 | Herron | ............... | A01D 43/06 |
| | | | | 56/341 |
| 2013/0096782 A1* | 4/2013 | Good | ............... | A01D 41/1217 |
| | | | | 701/50 |
| 2013/0158813 A1* | 6/2013 | McCully | ............... | A01D 41/1217 |
| | | | | 701/50 |
| 2013/0211675 A1* | 8/2013 | Bonefas | ............... | B62D 12/02 |
| | | | | 701/41 |
| 2014/0019017 A1* | 1/2014 | Wilken | ............... | G05B 13/024 |
| | | | | 701/50 |
| 2014/0053094 A1* | 2/2014 | Grevinga | ............... | G06F 3/04883 |
| | | | | 715/771 |
| 2014/0190084 A1* | 7/2014 | Schlagel | ............... | B65D 88/54 |
| | | | | 49/31 |
| 2014/0224377 A1* | 8/2014 | Bonefas | ............... | A01D 43/073 |
| | | | | 141/1 |

* cited by examiner

USER INTERFACE CONTROL FOR METERED GRAIN DISCHARGE

RELATED APPLICATIONS

The present application claims priority under 35 U.S.C. § 119 to U.S. Provisional Application Ser. No. 62/724,137, filed August 29, 2018. The full disclosure, in its entirety, of U.S. Provisional Application Ser. No. 62/724,137 is hereby incorporated by reference.

FIELD

Embodiments of the present invention relate to agricultural harvesting machines with crop unloading systems including a grain tank and a conveyor for unloading crop material from the grain tank to an external vehicle or location. More particularly, embodiments of the present invention relate to control systems and methods for such unloading systems.

BACKGROUND

Agricultural harvesting machines include combine harvesters, forage harvesters and sugar cane harvesters by way of example. These harvesting machines include headers for cutting a standing crop or picking up a windrowed crop before gathering and processing the crop in a manner which depends upon the given machine. A combine harvester, for example, serves to thresh, separate and clean grain before collecting the grain in an on-board grain tank. The grain is periodically unloaded from the grain tank to a grain cart or grain truck via an unload conveyor. Other harvesters, such as forage harvesters, discharge the crop via an unload conveyor continuously throughout harvest.

Unload conveyors traditionally comprise an auger (or screw conveyor) inside a tube. However, other types of conveyor are known such as belt unloaders or blowers. The unload conveyor is normally swingable between a stowed (or transport) position and a deployed (or unloading) position. In the stowed position the conveyor typically extends along the side of the harvester body so as not to exceed the maximum permitted width on the highway and to avoid in-field obstacles such as trees or utility poles. In the deployed position the conveyor extends substantially transversely away from the harvester in order to reach a cart or truck which is driven alongside during unloading.

The process of unloading commonly occurs simultaneously with the process of harvesting and so the driver of the harvester is often required to pay attention to both the harvesting process and the unloading process at the same time. The relative position of the unload conveyor and the cart can be adjusted by varying the harvester forward speed, the cart forward speed or the swing angle of the unload conveyor, wherein the latter option is normally preferred because it does not affect the harvest process and the harvester driver has a better view of the cart. "Topping off" the cart or truck when nearly full can be especially challenging for an operator of the combine harvester and/or an operator of the cart or truck when also concentrating on forward movement and other operations of the machine.

It can be difficult for the operator of a grain cart or grain truck to know the status of the unload conveyor, further complicating the unload process. If the unload conveyor is pivoting relative to the harvesting machine, for example, the operator of the grain cart or grain truck may not know the position or direction of movement of the conveyor. Additionally, the operator may not know when the unload conveyor was activated or deactivated. Even the operator of a harvesting machine may not know the immediate status of the unload conveyor as there can be, for example, a delay between the time the operator activates the conveyor and when crop begins flowing from the conveyor spout.

The above section provides background information related to the present disclosure which is not necessarily prior art.

SUMMARY

A combine harvester according to an embodiment of the invention comprises a storage bin for storing harvested crop, an unload conveyor pivotable between a stowed position and a deployed position, a flow gate for regulating a flow of harvested material from the storage bin to the unload conveyor, a first sensor for detecting a position of the flow gate and a second sensor for detecting a position of the unload conveyor. The harvester further comprises a controller configured to enable a user interface for receiving from an operator of the combine harvester a set point for the flow gate, an on/off indicator for the unload conveyor and an unload conveyor position indicator, presenting a graphic element depicting at least a portion of the combine harvester, the graphic element including a graphical depiction of the unload conveyor, and indicating, using only graphical variations of the graphical depiction of the unload conveyor, a position of the unload conveyor, an operating status of the unload conveyor, the set point of the flow gate and the position of the flow gate.

These and other important aspects of the present invention are described more fully in the detailed description below. The invention is not limited to the particular methods and systems described herein. Other embodiments may be used and/or changes to the described embodiments may be made without departing from the scope of the claims that follow the detailed description.

DRAWINGS

Embodiments of the present invention are described in detail below with reference to the attached drawing figures, wherein.

Figure 1:
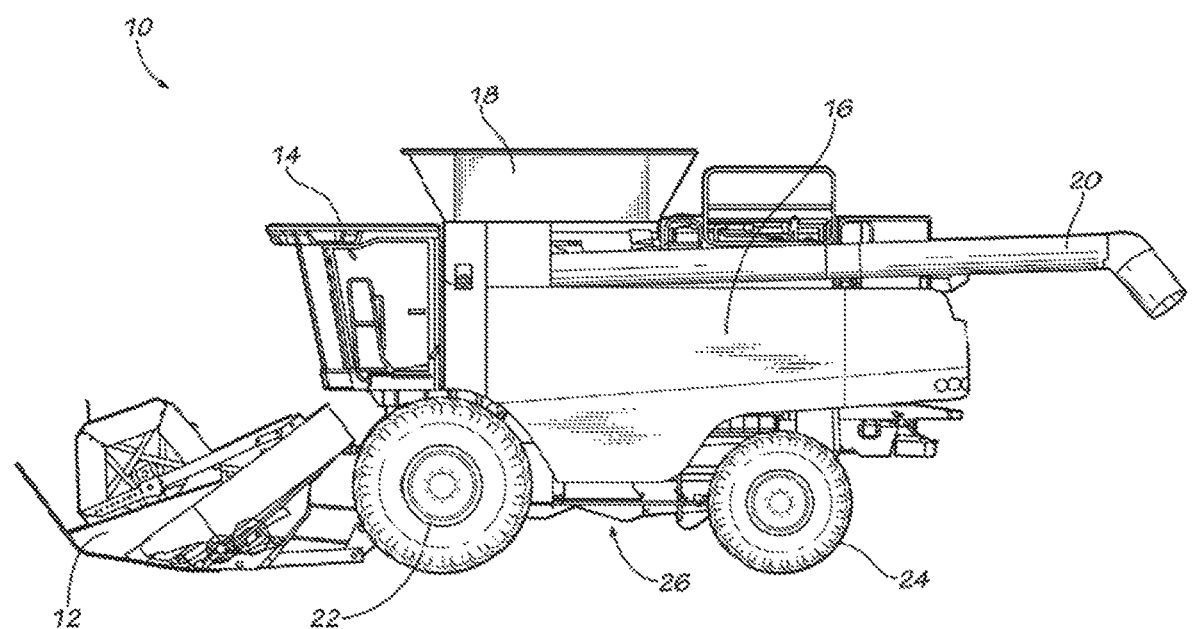
FIG. 1 is a combine harvester constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the spirit and scope of the invention as defined by the claims. The following description is, therefore, not to be taken in a limiting sense. Further, it will be appreciated that the claims are not necessarily limited to the particular embodiments set out in this description.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

When elements or components are referred to herein as being "connected" or "coupled," the elements or components may be directly connected or coupled together or one or more intervening elements or components may also be present. In contrast, when elements or components are referred to as being "directly connected" or "directly coupled," there are no intervening elements or components present.

Specific embodiments of the invention will now be described with reference to the drawings. FIG. 1 shows an agricultural harvesting machine in the form of a combine harvester 10. Principals of the invention will be described hereinafter with reference to the combine harvester 10. However, it should be understood that aspects of the invention can be embodied in other agricultural harvesters including, by way of example only, forage harvesters and sugar cane harvesters.

Combine harvester 10 includes ground engaging means in the form of front wheels 22 and rear wheels 24. A frame is designated generally at 26 and supports at its front end a header 12. The core or body 16 of the machine includes crop processing apparatus (hidden from view) which normally includes, in the case of a combine harvester, threshing apparatus, separating apparatus and a grain cleaning system. In other types of harvesting machine the crop processing apparatus may differ. For example, a forage harvester will normally include, inter alia, crop processing rollers.

With reference again to the combine harvester 10, an on-board grain bin 18 provides a compartment to store the collected grain before unloading into a grain cart or grain truck via an unloading system to be described in more detail below. It should be appreciated that other types of harvesting machines may not include an on-board bin. The combine harvester 10 further comprises a drivers cab 14 from which the driver operates the harvester 10 using various user input devices.

Figure 2:
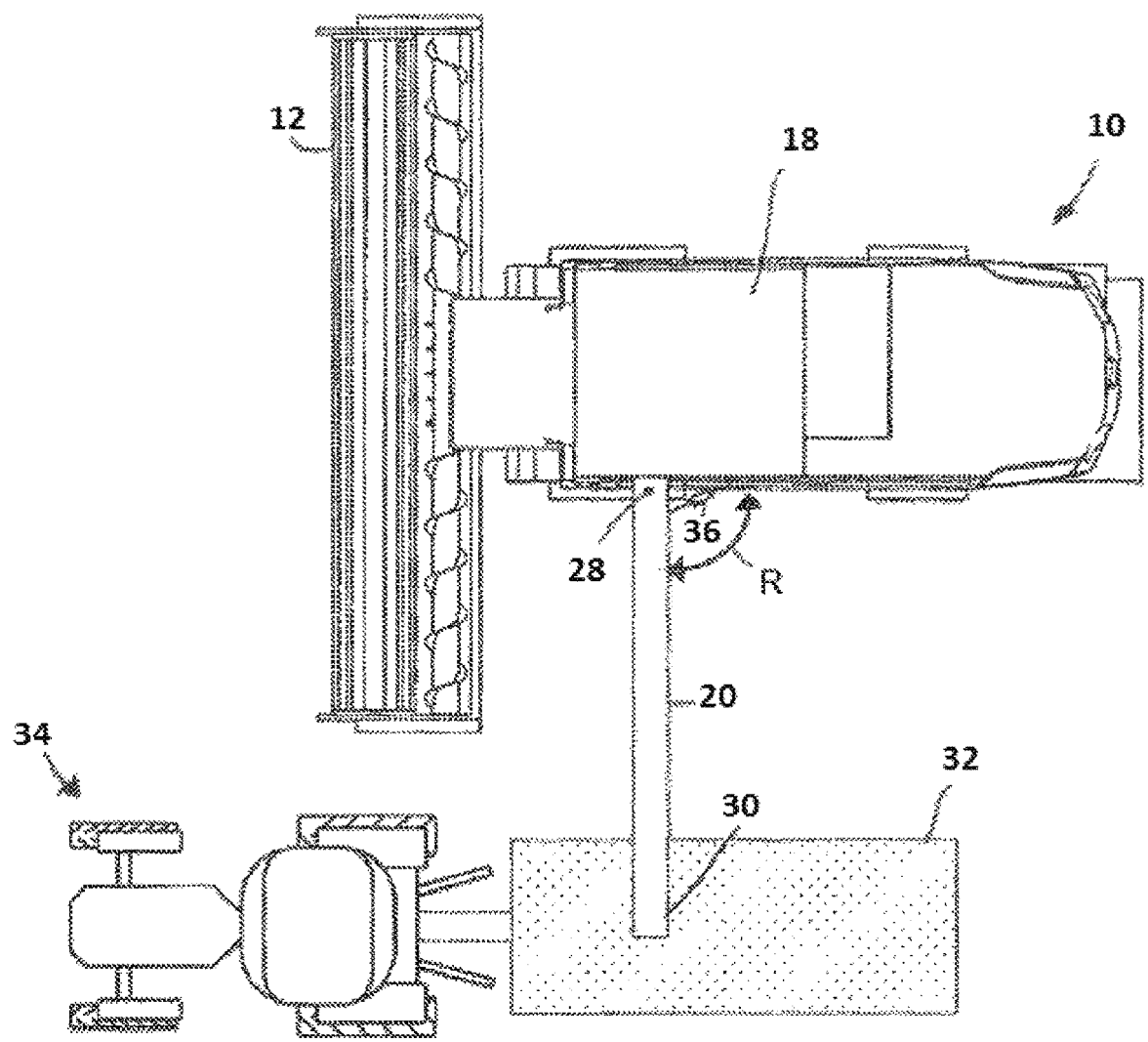
FIG. 2 is the combine harvester of FIG. 1 illustrated unloading grain into a grain cart pulled by a tractor.

With reference also to FIG. 2, the unloading system of the combine harvester 10 includes an unload conveyor 20 which is pivotably mounted to the frame 26 for pivoting movement around an upright axis 28 through a movement range which is indicated by arrow R. In a first end (or stowed or transport) position (FIG. 1) the unload conveyor 20 is aligned generally longitudinally and resides alongside the body 16 of harvester 10. In a second end (or deployed or unloading) position (FIG. 2) the unload conveyor 20 extends transversely away from the pivot axis 28 so that a discharge end 30 can be positioned above a grain cart 32, which is, in this embodiment at least, towed by an agricultural tractor 34 as is common in the art today. An unload conveyor actuator 36 moves the unload conveyor 20 to be positioned at any angle between the first and second end positions.

While not illustrated in FIG. 1, a crop flow gate located in the grain bin 18 is moveable between a fully open position, wherein a maximum amount of crop flows into the unload conveyor 20, and a fully closed position, wherein no crop flows into the unload conveyor 20. The flow gate may be moved to any of multiple positions between the fully closed and the fully open positions, wherein each position allows a different amount of crop to flow into the unload conveyor 20. By adjusting the position of the flow gate, the operator can regulate an amount of crop flowing through the unload conveyor 20 and, thus, the rate at which crop material is unloaded from the grain bin 18. Adjusting the unload rate may be desirable, for example, where the operator wants to slow the flow of grain into the grain cart such as when the cart is nearly full. It may also be desirable to close the flow gate before deactivating the unload conveyor 20 to ensure that the unload conveyor 20 is empty of crop material when it is deactivated.

Although shown as being at a right-angle with respect to the longitudinal axis of the harvester 10 when in the second end position, the unload conveyor 20 in an alternative embodiment may swing beyond ninety degrees so that the unload conveyor 20 is angled forwardly to a limited extent. Furthermore, although shown as a turret-style unload conveyor with a substantially upright pivot axis, the conveyor shown may be substituted with other types of unload conveyor such as swivel-type conveyors that pivot around an axis that is angled with respect to vertical. The actuator 36 is connected between the unload conveyor 20 and the frame 26 and serves to control swing movement of the unload conveyor 20 between the first and second end positions. In one embodiment the actuator 36 is a hydraulic actuator but electric actuators can be employed instead.

Figure 3:
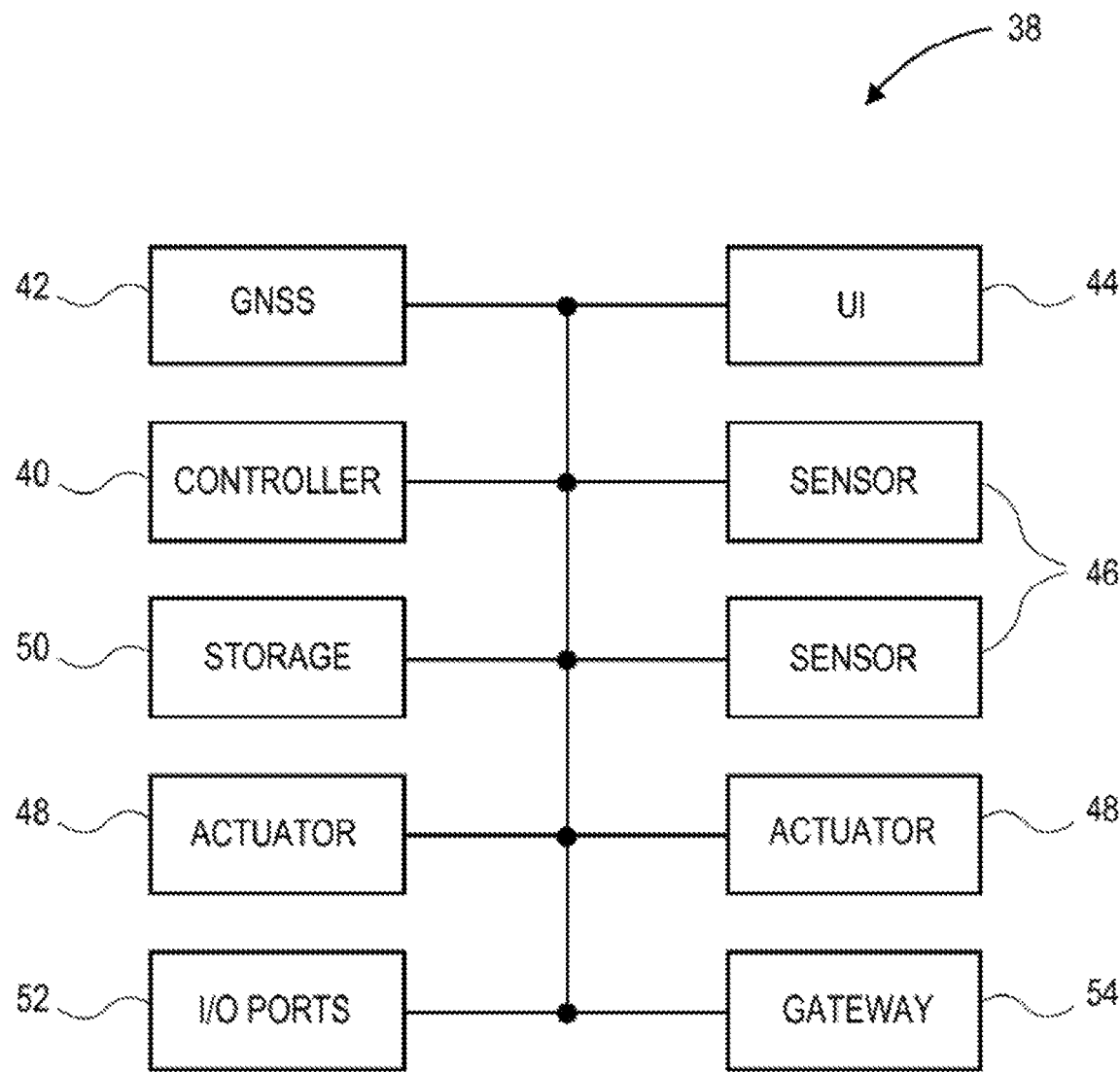
FIG. 3 is a block diagram of a control and communications system used on the combine of FIG. 1.

Aspects of the present invention can be implemented by or with the assistance of an electronic system, such as a control and communications system associated with the combine harvester 10. Various components of an exemplary electronic system 38 are illustrated in FIG. 3. The system 38 broadly includes a controller 40, a position determining device 42, a user interface 44, one or more sensors 46, one or more actuators 48, one or more data storage components 50, one or more input/out ports 52 and a wireless communications gateway 54.

Figure 4:
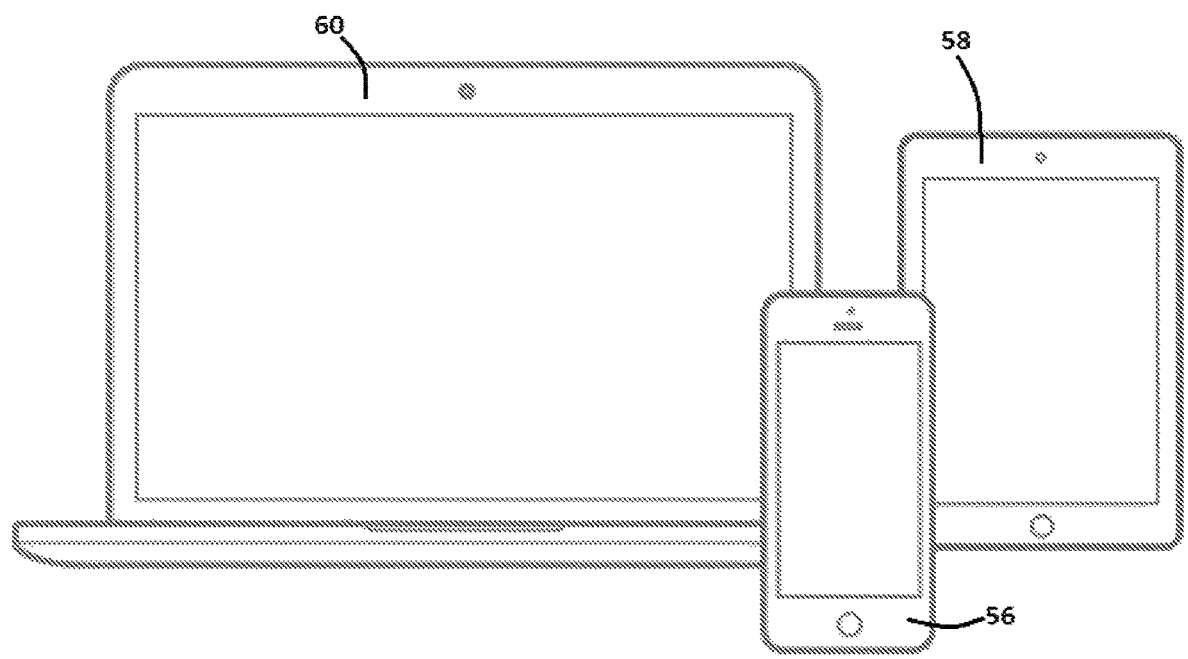
FIG. 4 illustrates exemplary portable electronic devices that may be used with embodiments of the present invention.

The position determining device 42 may include a global navigation satellite system (GNSS) receiver, such as a device configured to receive signals from one or more positioning systems such as the United States' global positioning system (GPS), the European GALILEO system and/or the Russian GLONASS system, and to determine a location of the machine using the received signals. The user interface 44 includes components for receiving instructions or other input from a user and may include buttons, switches, dials, and microphones, as well as components for presenting information or data to users, such as displays, light-emitting diodes, audio speakers and so forth. The user interface 44 may include one or more touchscreen displays capable of presenting visual representations of information or data and receiving instructions or input from the user via a single display surface. With reference also to FIG. 4, the user interface 44 may include portable or handheld electronic devices such as one or more smartphones 56, one or more tablet computers 58, one or more laptop computers 60, or a combination thereof, that are in wireless communication with the system 38 by way of the wireless communications gateway 54.

The sensors 46 may be associated with any of various components or functions of an associated machine including, for example, various elements of the engine, transmission(s), and hydraulic and electrical systems. One or more of the sensors 46 may be placed to detect a position of the unload conveyor 20, and one or more of the sensors 46 may be placed to detect a position of the flow gate. The actuators 48 are configured and placed to drive certain functions of the machine including, for example, the position of the unload conveyor 20 and the position of the flow gate. The actuators 48 may take virtually any form but are generally configured to receive control signals or instructions from the controller 40 (or other component of the system 38) and to generate a mechanical movement or action in response to the control signals or instructions. By way of example, the sensors 46 and actuators 48 may be used in crop unloading operations to move the unload conveyor 20 to a desired position relative to the combine harvester 10, to move the flow gate to a desired position, to drive an auger associated with the unload conveyor 20, to detect a position of the unload conveyor 20 and to detect a position of the flow gate.

The controller 40 includes one or more integrated circuits programmed or configured to implement the functions described herein. By way of example the controller 40 may be a digital controller and may include one or more general purpose microprocessors or microcontrollers, programmable logic devices, or application specific integrated circuits. The controller 40 may include multiple computing components placed in various different locations on the machine. The controller 40 may also include one or more discrete and/or analog circuit components operating in conjunction with the one or more integrated circuits or computing components. Furthermore, the controller 40 may include or have access to one or more memory elements operable to store executable instructions, data, or both. The data storage device 50 stores data and preferably includes a non-volatile storage medium such employing optic, magnetic or solid state technology or the like. As mentioned above, the controller 40 may include multiple computing devices. Such computing devices may be located at distinct locations on the combine harvester 10 and may take the form of electronic control units or "ECUs" as is known in the art. The controller 40 as described herein is an example of "one or more computing devices" as used in this document.

It will be appreciated that, for simplicity, certain elements and components of the system 38 have been omitted from the present discussion and from the drawing of FIG. 3. A power source or power connector is also associated with the system 38, for example, but is conventional in nature and, therefore, is not discussed herein.

In some embodiments, all of the components of the system 38 are contained on or in a host machine, such as the combine harvester 10. The present invention is not so limited, however, and in other embodiments one or more of the components of the system 38 may be external to the machine. In another embodiment, for example, some of the components of the system 38 are contained on or in the machine while other components of the system are contained on or in an implement associated with the machine. In that embodiment, the components associated with the machine and the components associated with the implement may communicate via wired or wireless communications according to a local area network such as, for example, a controller area network. The system 38 may be part of a communications and control system conforming to the ISO 11783 (also referred to as "ISOBUS") standard. In yet another exemplary embodiment, one or more components of the system 38 may be located remotely from the machine and any implements associated with the machine. In that embodiment, the system 38 may include wireless communications components (e.g., the wireless communications gateway 54) for enabling the machine to communicate with a remote computer, computer network or system.

As explained above, the system 38 is configured to produce controlled movement of the unload conveyor 20 within the movement range R in response to a user input signal, to activate and deactivate the unload conveyor 20 and to move the flow gate to a desired position. The system 38 is further configured to present information about the position and status of the unloading system via the user interface 44. More particularly, the system 38 is configured to present information indicating a position of the unload conveyor 20, an activated/deactivated status of the unload conveyor 20, a setting of the flow gate and a position of the flow gate. This aspect of the invention is described below in greater detail.

Figure 7:
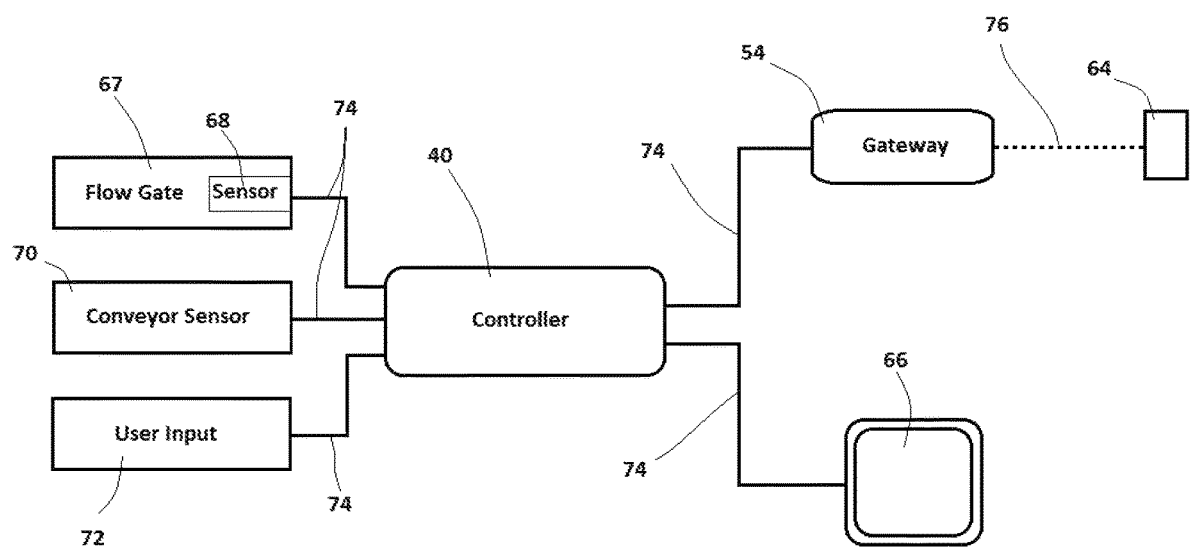
FIG. 7 is a block diagram of certain components of a user interface system according to embodiments of the invention.

A block diagram illustrating certain components of the system 38 in greater detail is illustrated in FIG. 7. The controller 40 receives signals from a flow gate sensor 68 associated with a flow gate 67 indicating an actual position of the flow gate 67. The controller 40 also receives signals from a conveyor sensor 70 indicating a position of the unload conveyor 20 relative to the combine body 16. The controller 40 further receives signals from one or more user input devices 72 which may include standalone input devices such as tactile switches, buttons or scroll wheels, and may include user input received from an integrated input/output device such as a touchscreen display.

Figure 5:
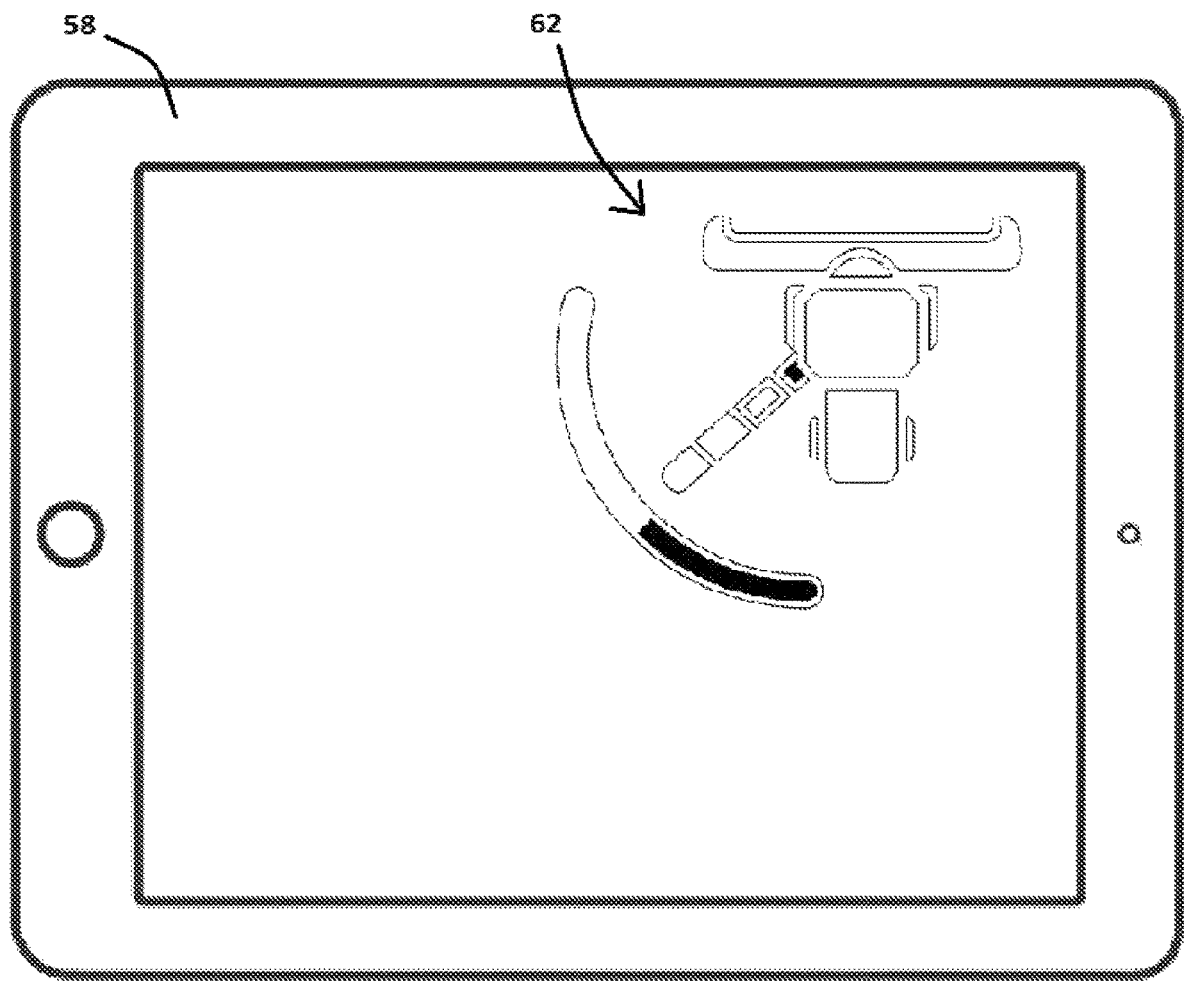
FIG. 5 is a portable electronic device configured to present a graphical user interface according to embodiments of the present invention.
Figure 6:
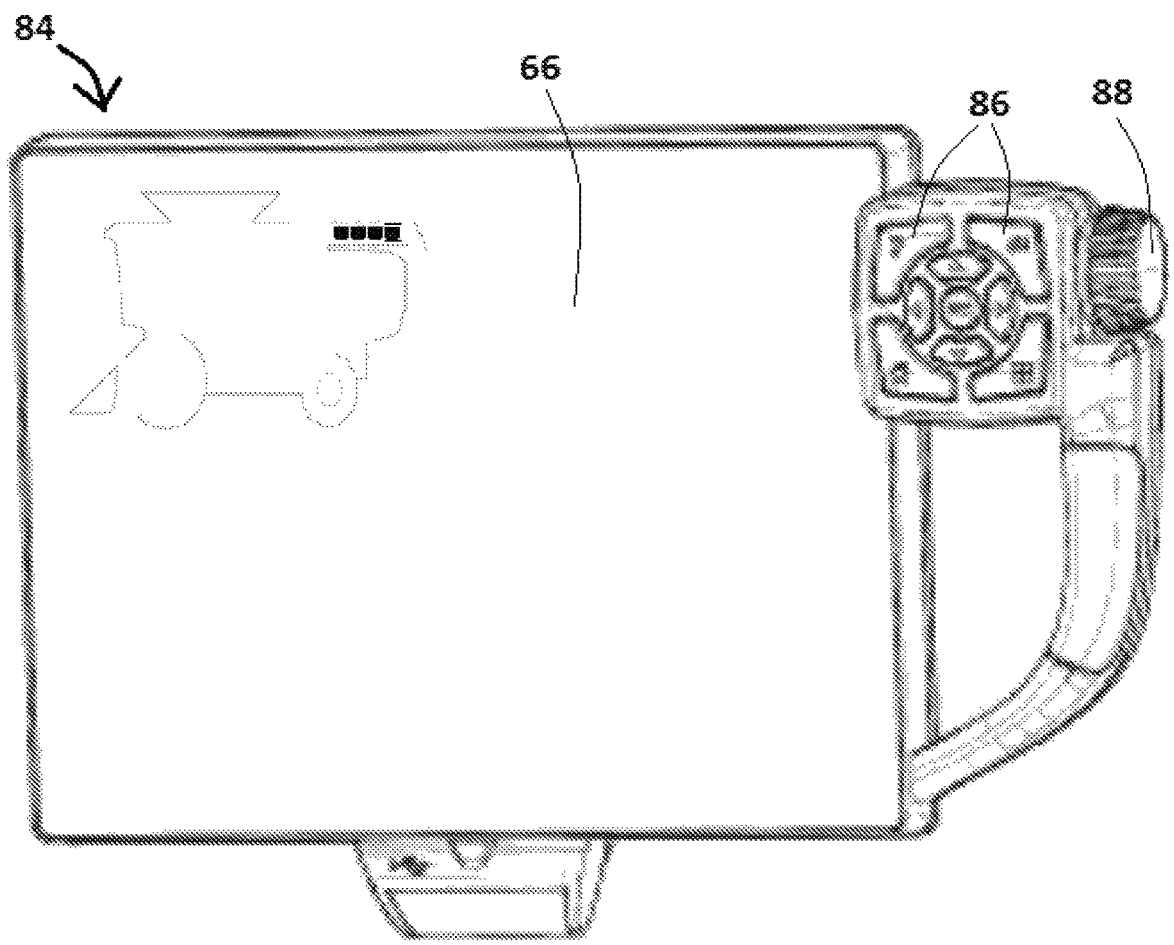
FIG. 6 is a user interface console for use in the combine harvester of FIG. 1.

The controller 40 is programmed or configured to communicate with the wireless communications gateway 54 and an in-cab display 66 to enable user interface functionality on the console 66 as well as on one or more portable electronic devices 64 in wireless communication with the gateway 54. The controller 40 is in wired communication with the flow gate sensor 68, the conveyor sensor 70, the user input device 72, the wireless communications gateway 54 and the in-cab display 66 via a wired communications link 74, which may be enabled, for example, using the controller area network ("CAN") bus standard. The wireless communications gateway 54 is in communication with a portable electronic device 64 via a wireless communications link 76, which may be enabled, for example, using the Wi-Fi (IEEE 802.11) communications standard. The portable electronic device 64 may be a tablet computer, such as the tablet 58 illustrated in FIG. 5 and presenting a user interface icon 62 according to embodiments of the present invention. The in-cab display 66 may be part of an in-cab user console 84 illustrated in FIG.

6 and including the display 66, various tactile user input devices such as buttons 86 and a scroll wheel 88.

Figure 8:
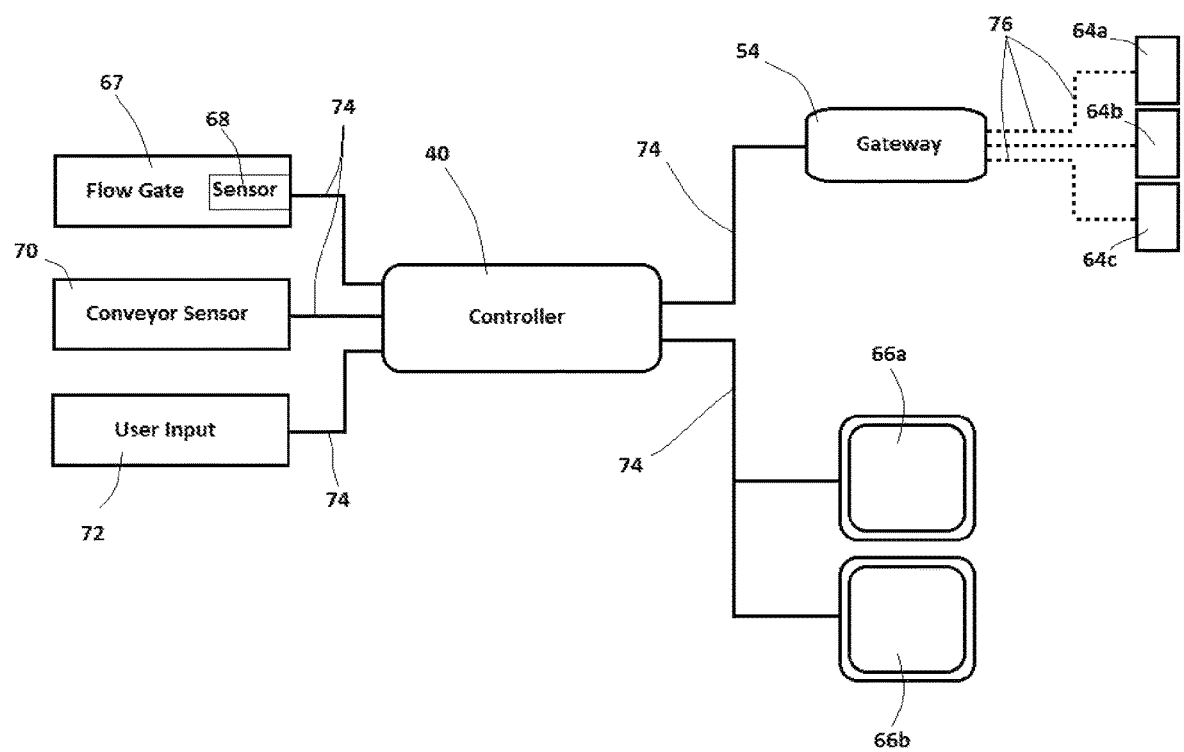
FIG. 8 is a block diagram of certain components of a user interface system according to embodiments of the invention.
Figure 9:
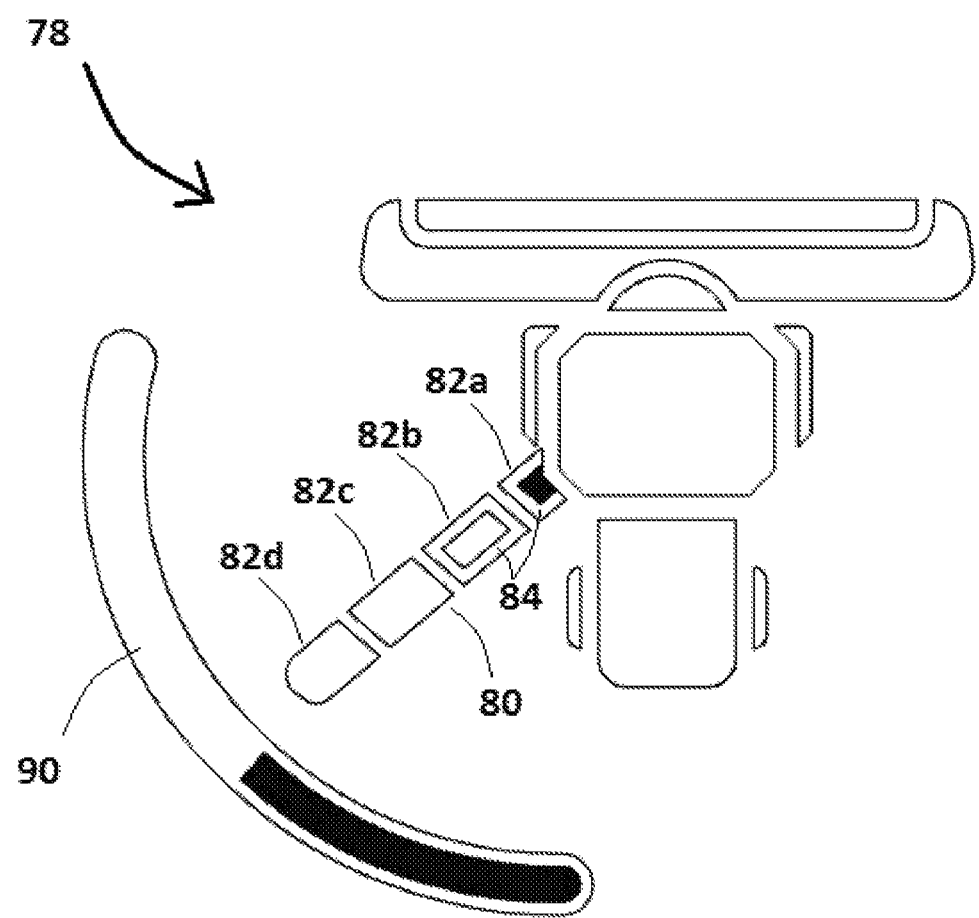
FIGS. 9-13 illustrate an exemplary user interface icon for use with the combine harvester of FIG. 1 according to embodiments of the invention.

A system according to another embodiment of the invention is illustrated in FIG. 8. The system of FIG. 8 is similar to the system of FIG. 7 except that the system of FIG. 8 includes a plurality of portable electronic devices 64a, 64b and 64c and two in-cab displays 66a and 66b. The portable electronic devices 64 may be located in or near the operator cabin 14 of the combine harvester 10 or anywhere in the vicinity of the combine harvester 10, including in other vehicles operating near the combine harvester 10 such as the tractor 34. Therefore, any number of portable electronic devices 64 may be used with the present invention and is not limited to three as illustrated in FIG. 8.

Turning now to FIGS. 9 through 13, a graphic element 78 according to a first embodiment of the invention is illustrated. The graphic element 78 is presented to an operator through the graphical user interface 44, depicts at least a portion of the combine harvester 10 including a graphical depiction 80 of the unload conveyor 20. The graphic element 78 indicates, using only graphical variations of the graphical depiction 80 of the unload conveyor 20, a position of the unload conveyor 20, an operating status of the unload conveyor 20, a set point of the flow gate and a position of the flow gate 67. The graphical depiction 80 of the unload conveyor 20 is positioned on the same side of the combine harvester 10 in the graphic element 78 as the actual unload conveyor 20 is on the actual combine harvester 10, and the graphical depiction of the unload conveyor 20 in the stowed and deployed positions corresponds to the stowed and deployed positions of the unload conveyor 20 on the actual combine harvester 10. Movement of the graphical depiction 80 of the unload conveyor 20 also corresponds to the movement of the actual unload conveyor 20 relative to the combine harvester 10. The pivot point of the graphical depiction 80 is at the same location on the combine harvester 10 as the actual pivot point. Thus, an operator can quickly and easily detect from the graphic element 78 what the position of the unload conveyor 20 is relative to the combine harvester 10.

The graphical depiction 80 of the unload conveyor also indicates the set point of the flow gate 67, the actual position of the flow gate 67 and whether the unload conveyor 20 is presently activated or deactivated. The graphical representation 80 of the unload conveyor 20 is presented in visibly distinguishable segments 82a, 82b, 82c and 82d. The present set point of the flow gate 67 is indicated by an widened outer perimeter 84 on one or more of the segments 82 (or none of the segments if the set point is zero). If none of the segments 82 includes the widened outer perimeter 84 the set point is fully closed, wherein the flow gate 67 is closed and no crop material flows into the unload conveyor 20. If only the first segment 82a includes the widened outer perimeter 84 the flow gate set point is at a low position wherein a small amount of crop material is allowed to pass into the unload conveyor 20. The low set point may correspond to the flow gate 67 being one-fourth open. If the first segment 82a and the second segment 82b both include the widened outer perimeter 84, the set point is at a medium position wherein a medium amount of crop material is allowed to pass into the unload conveyor 20. The medium set point may correspond to the flow gate 67 being one-half open. If the first 82a, second 82b and third 82c segments all include the widened outer perimeter 84, the flow gate 67 set point is high, wherein a large amount of crop material is allowed to pass into the unload conveyor 20. The high set point may correspond to the flow gate 67 being three-fourths open. If all of the segments 82 include the outline, the flow gate 67 set point is fully open, wherein the flow gate 67 allows the maximum amount of crop material to pass into the unload conveyor 20. Thus, an operator viewing the graphical element 78 can quickly and easily detect what the flow gate 67 set point is.

The same graphical representation 80 of the unload conveyor 20 also indicates the actual position of the flow gate 67 (in contrast to the set point of the flow gate 67). In the illustrated example, this is done with a fill color of each of the segments 82. If none of the segments 82 includes a fill color the actual position of the flow gate 67 is fully closed. If only the first segment 82a includes the fill color (FIG. 9) the actual position of the flow gate 67 is at the low position. If the first segment 82a and the second segment 82b both include the fill color (FIG. 10), the actual position of the flow gate 67 is at the medium position. If the first 82a, second 82b and third 82c segments all include the fill color (FIGS. 12 and 13), the actual position of the flow gate 67 is high. If all of the segments 82 include the fill pattern (FIG. 11), the actual position of the flow gate 67 is fully open. Thus, an operator viewing the graphical element 78 can quickly and easily detect what the actual position of the flow gate 67 is.

The same graphical representation of the unload conveyor also indicates whether the unload conveyor is in an activated state or deactivated state. The color of each segment may be a first color, for example, when the unload conveyor is in a deactivated state, for example, and may be a second color when the unload conveyor is in an activated state. An arcuate element 90 may also be included in the graphical element 78 to help illustrate the position of the graphical representation 80 of the unload conveyor 20. A fill level of the arcuate element 90 indicates a relative position of the unload conveyor and helps an operator see how near the conveyor is to a fully deployed position or a fully stowed position.

Figure 10:
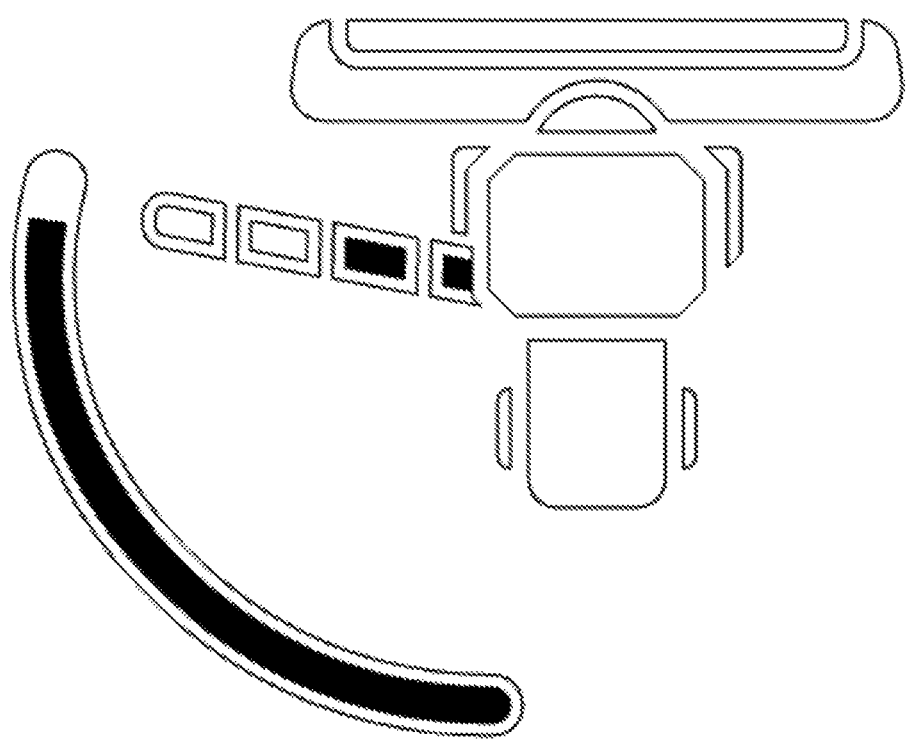
Figure 11:
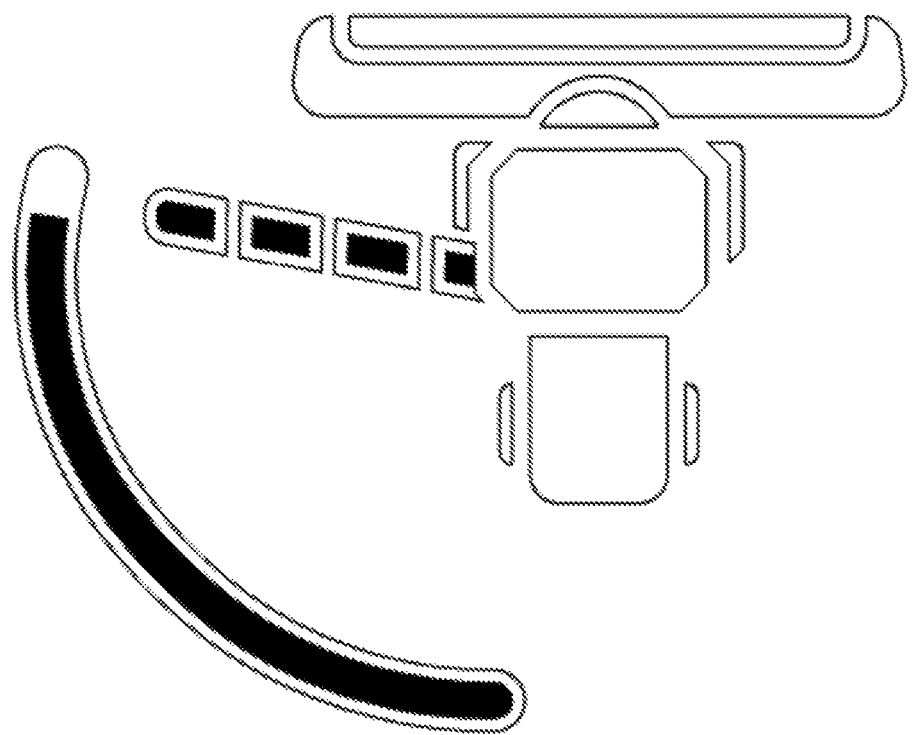
Figure 12:
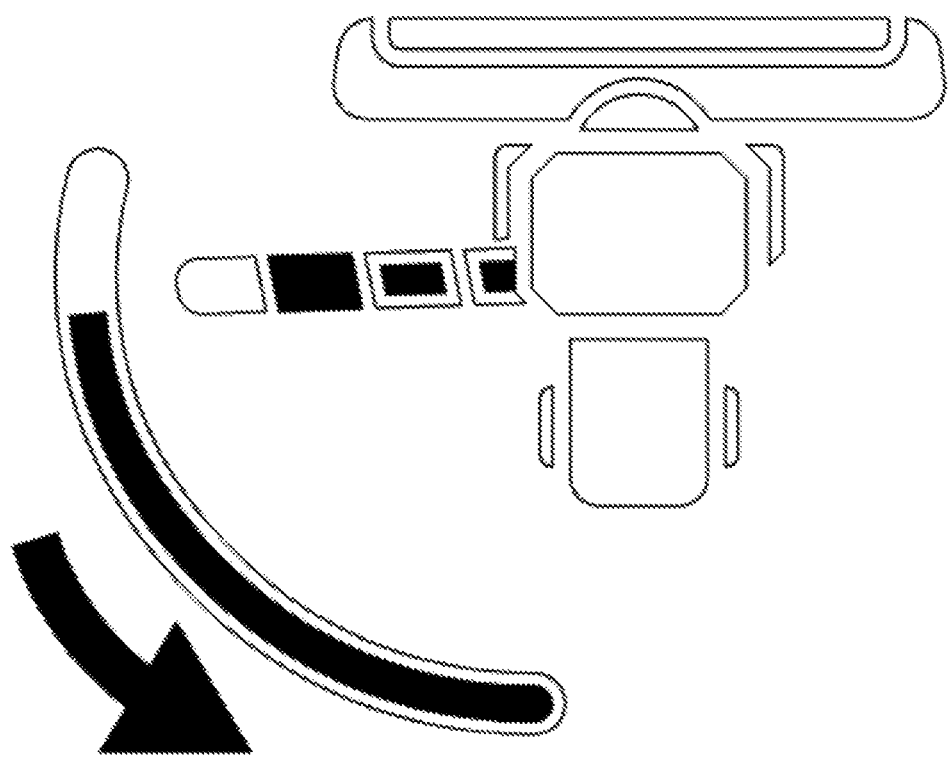
Figure 13:
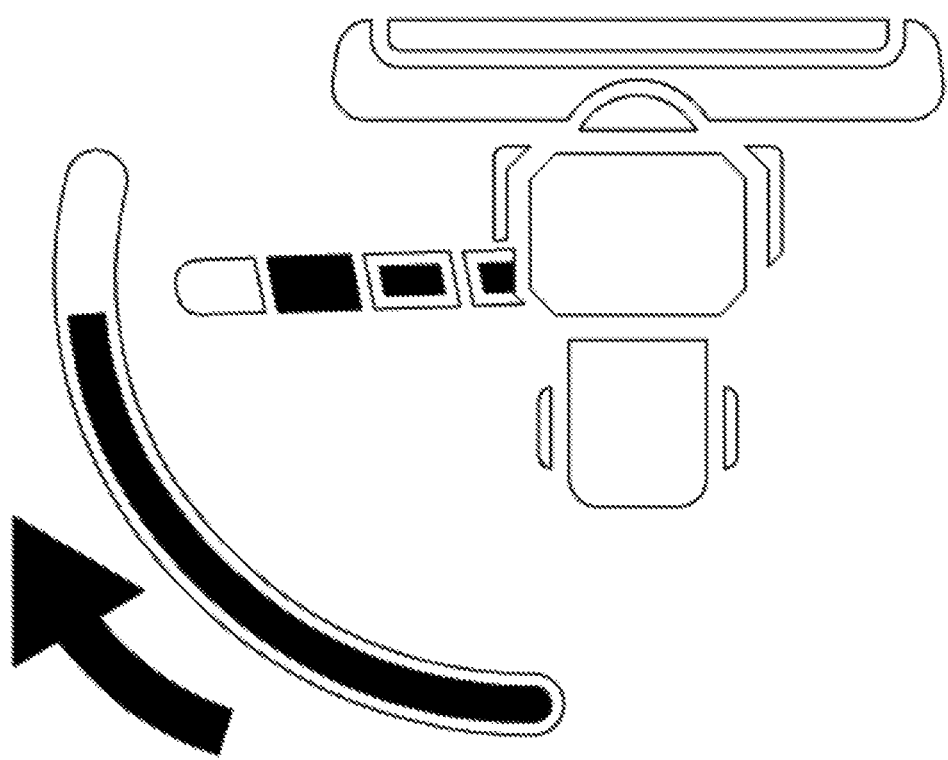
Figure 14:
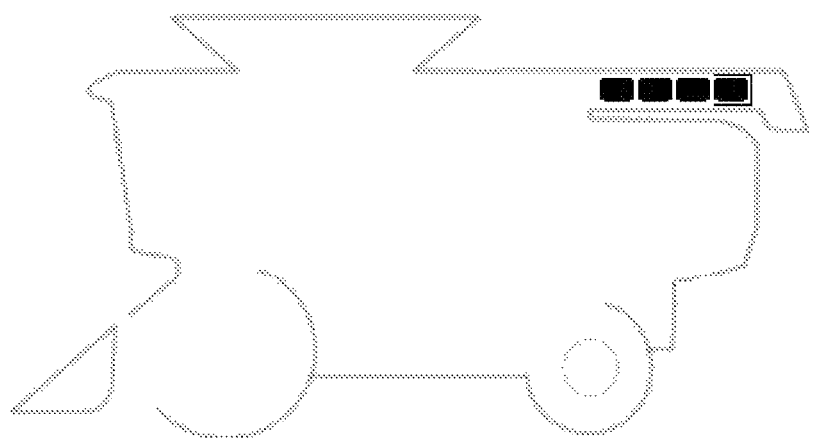
FIG. 14 illustrates another exemplary user interface icon for use with the combine harvester of FIG. 1 according to embodiments of the invention.

FIG. 10 illustrates the graphical element 78 with the graphical representation 80 of the unload conveyor 20 in a nearly fully deployed position, with the flow gate 67 fully open and actual position of the flow gate 67 one-half open. FIG. 11 illustrates the graphical element 78 with the graphical representation 80 of the unload conveyor 20 in a nearly fully deployed position, with the flow gate 67 fully open and actual position of the flow gate 67 fully open. FIG. 12 illustrates the graphical element 78 with the graphical representation 80 of the unload conveyor 20 moving from a deployed position to a stowed position as indicated by the arrow, with the flow gate 67 set point set at one-half open and the actual position of the flow gate 67 being high. This may be the case because the actual position of the flow gate 67 lags the set point. FIG. 13 illustrates the graphical element 78 with the graphical representation 80 of the unload conveyor 20 moving from a stowed position to a deployed position as indicated by the arrow, with the flow gate 67 set point set at one-half open and the actual position of the flow gate 67 being high. FIG. 14 is a graphical element according to another embodiment of the invention illustrating a flow gate 67 set point and actual position but not illustrating a position of the unload conveyor 20.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A combine harvester comprising:
   a storage bin for storing harvested crop,
   an unload conveyor pivotable between a stowed position and a deployed position;
   a flow gate for regulating a flow of harvested material from the storage bin to the unload conveyor;
   a first sensor for detecting a position of the flow gate;
   a second sensor for detecting a position of the unload conveyor;
   one or more computing devices configured to enable a user interface for—
      receiving from an operator of the combine harvester a set point for the flow gate, an on/off indicator for the unload conveyor and an unload conveyor position indicator,
      presenting a graphic element depicting at least a portion of the combine harvester, the graphic element including a graphical depiction of the unload conveyor, and
      indicating, using only graphical variations of the graphical depiction of the unload conveyor, a position of the unload conveyor, an operating status of the unload conveyor, the set point of the flow gate and the position of the flow gate.

2. The combine harvester as set forth in claim 1, the graphic element indicating the position of the unload conveyor as a position of the graphical depiction of the unload conveyor about a pivot point.

3. The combine harvester as set forth in claim 2, the graphic element further indicating the position of the unload conveyor as a fill pattern of an arcuate graphical element separate from the graphical depiction of the unload conveyor.

4. The combine harvester as set forth in claim 1, the graphic element indicating the set point of the unload conveyor as a fill pattern in the graphical depiction of the unload conveyor.

5. The combine harvester as set forth in claim 1, the graphic element indicating the position of the flow gate as a second fill pattern in the graphical depiction of the unload conveyor.

6. The combine harvester as set forth in claim 1, the graphic element indicating the operating status of the unload conveyor as a color of at least a portion of the graphical depiction of the unload conveyor.

7. The combine harvester as set forth in claim 1, further comprising a wireless transceiver, the one or more computing devices configured to enable the user interface on a portable electronic device through wireless communications through the wireless transceiver.

* * * * *